United States Patent

Anderson

[15] 3,646,376
[45] Feb. 29, 1972

[54] HIGH-FREQUENCY TACHOMETER GENERATOR

[72] Inventor: Richard E. Anderson, Lynn, Mass.
[73] Assignee: General Electric Company
[22] Filed: May 1, 1970
[21] Appl. No.: 33,639

[52] U.S. Cl..............................310/156, 310/171, 310/263
[51] Int. Cl..................................................H02k 21/12
[58] Field of Search..................310/156, 171, 169, 170, 42, 310/46, 181, 257, 166, 168, 155, 102, 193, 261, 263

[56] References Cited

UNITED STATES PATENTS

| 3,483,411 | 12/1969 | Amako | 310/263 |
| 2,985,778 | 5/1961 | Fritz | 310/156 |
| 3,032,670 | 5/1962 | Fritz | 310/263 |
| 3,059,131 | 10/1962 | Everard | 310/156 |
| 3,452,228 | 6/1969 | Woolley | 310/263 |
| 2,548,633 | 4/1951 | Stephenson | 310/164 |

Primary Examiner—J. D. Miller
Assistant Examiner—R. Skudy
Attorney—I. David Blumenfeld, Frank L. Neuhauser, Oscar B. Waddell and Joseph B. Forman

[57] ABSTRACT

An AC tachometer generator having a lightweight rotor adapted to be mounted on a rotating shaft, the speed of which is to be measured. The rotor permanent magnet is protected from knockdown when the generator is disassembled by a pole piece construction enclosing the rotor. Flux from the rotor is alternately switched through a bridging member having axially extending fingers disposed on opposite sides of the rotor and aligned with rotor poles having opposite magnetic polarity.

5 Claims, 5 Drawing Figures

INVENTOR
RICHARD E. ANDERSON
BY
ATTORNEY

HIGH-FREQUENCY TACHOMETER GENERATOR

BACKGROUND OF THE INVENTION

The present invention relates to dynamoelectric machines and more particularly, to an alternating current generator having a high frequency output voltage. It is particularly useful as a tachometer generator for supplying a frequency signal to electronic engine speed indicators used on jet aircraft.

Alternating current generators of the type utilizing a permanent magnet rotor to eliminate the need for slip rings have long been used on aircraft as tachometer generators because of their simplicity, dependability and rugged construction. Such generators are often mounted directly on jet engines where they are subject to severe vibration and high-operating temperatures that may run as high as 350° F. Under such operating conditions the grease in the generator bearings tends to deteriorate so that frequent inspection and servicing are required to avoid possible bearing seizure. While the generator is dismantled for servicing, great care must be used to prevent accidental knockdown of the rotor permanent magnet with resulting loss in its magnetic output. Such knockdown may occur, for example, by opening up airgaps in the working magnetic circuit of the generator during disassembly. Knockdown may also be caused by exposure of the rotor to stray AC or DC magnetic fields which may demagnetize the rotor magnet.

Accordingly, it is an object of the present invention to provide a new and improved AC tachometer generator having a simple lightweight rotor that may be mounted directly on the output shaft whose speed is to be measured thereby eliminating the need for generator bearings.

A further object of the invention is to provide an improved AC tachometer generator of the permanent magnet type having an improved rotor construction which eliminates the danger of accidental knockdown of the rotor magnet during disassembly for service and inspection.

A still further object of the invention is to provide an AC tachometer generator having a simplified construction which can be manufactured at low cost and easily dismantled for service and inspection.

Further objects and advantages of the invention will become apparent as the following description proceeds.

SUMMARY

Briefly, in accordance with the invention, the rotor of the generator comprises a cylindrical permanent magnet magnetized along its axis with end plates adjacent opposite ends of the magnet. Disposed around the outer periphery of each end plate is a set of equally spaced elongated teeth, the end portions of which form pole pieces extending around, over and spaced from the sides of the magnet. The pole pieces of each set have opposite magnetic polarity and are staggered with opposing pole pieces having airgaps therebetween. Magnetic flux from the rotor pole pieces circulates through a stator bridging member having fingers which overlie the rotor or opposite sides so that the fingers are alternately presented to rotor poles of opposite polarity during rotation of the rotor. This causes the magnetic flux in the bridging member to reverse periodically and induce an output voltage in an induction coil carried on the bridging member. The arrangement of the rotor pole pieces provides a keepering action which prevents accidental knockdown of the rotor when it is removed as a unit for service and inspection. Since the rotor is small and light, it may be mounted directly on an engine output shaft thereby eliminating the need for any generator bearings. The stator is mounted in a nonmagnetic casing which may be easily removed separately from the rotor.

For a better understanding of the invention, reference should be made to the following detailed description taken in connection with the accompanying drawings.

DESCRIPTION OF THE ILLUSTRATED EMBODIMENT

Figure 1:
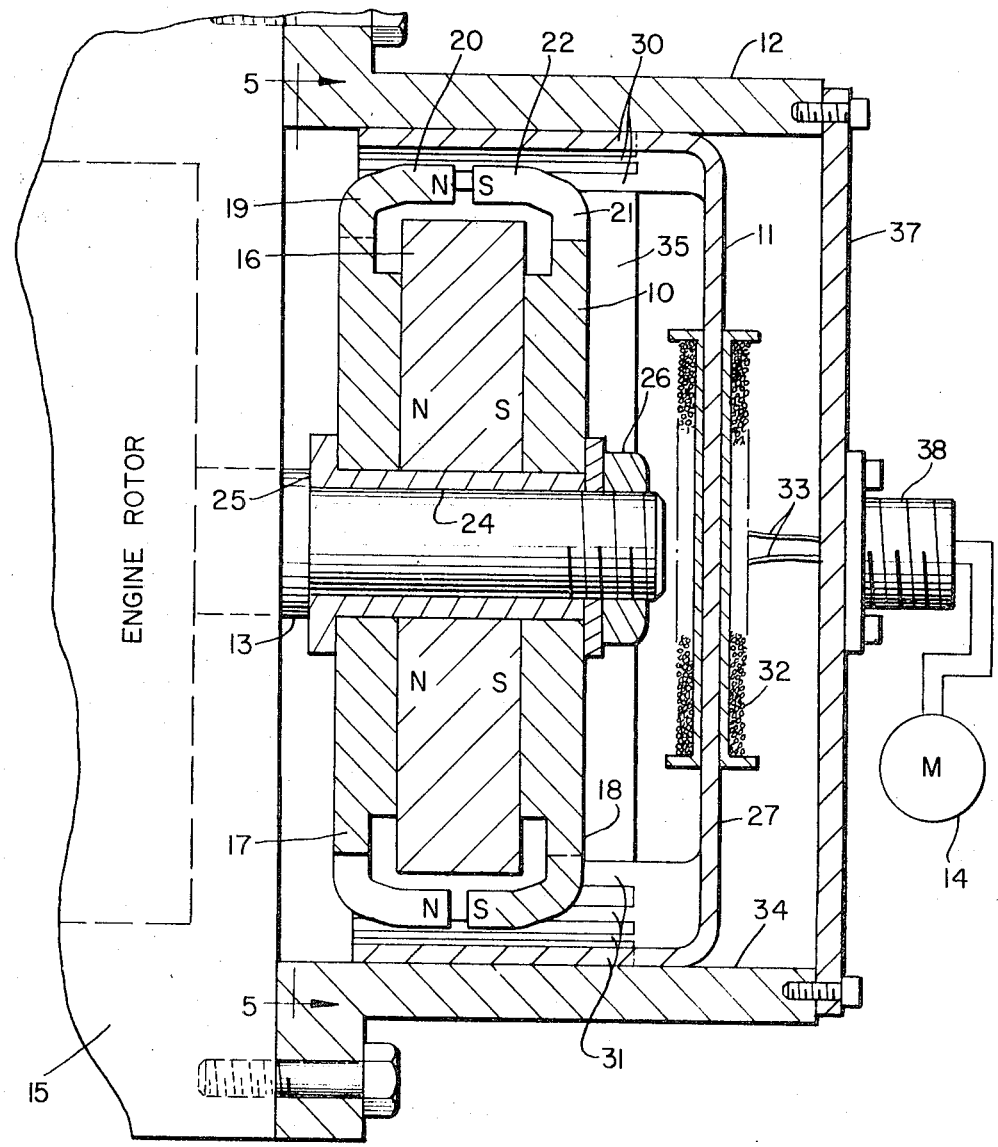
FIG. 1 is a side elevation view of the tachometer generator, partly in section with the rotor mounted on an output shaft of an aircraft engine, the speed of which is to be measured.

Referring to FIG. 1 of the drawing, a generator embodying the invention is shown as comprising three principal parts, namely a rotor 10, a stator 11 and a casing 12. The rotor may, as shown, be mounted directly on a rotating shaft 13, the speed of which is to be measured by a speed inductor 14 responsive to frequency of the generator output voltage. For application to a jet engine, the shaft 13 may be driven by the rotor of the engine supported in a housing 15 to which the casing 12 of the generator is attached.

Figure 2:
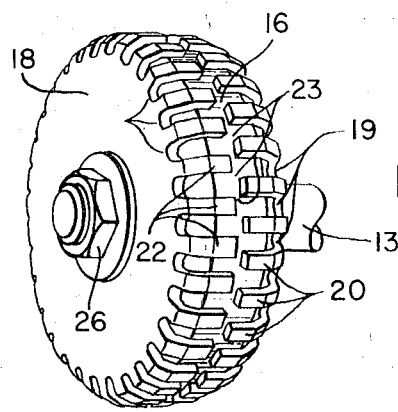
FIG. 2 is a side perspective view of the generator rotor illustrating certain details of construction.
Figure 5:
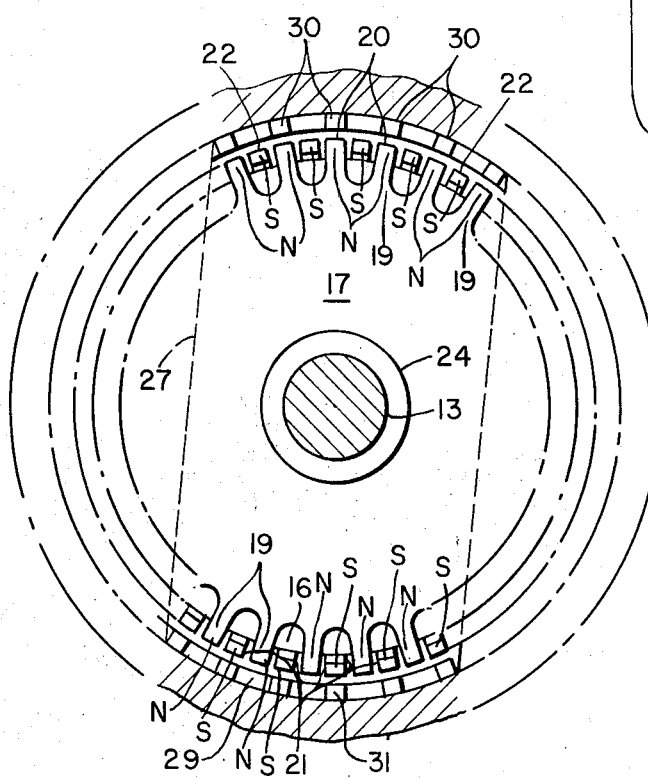
FIG. 5 is an end view of the rotor and stator assembly as viewed in the direction of the section line 5—5 of FIG. 1 illustrating the operating relationship between the stator bridging member fingers and the rotor pole pieces.

The construction of the rotor 10 is illustrated in FIGS. 1, 2 and 5. It comprises a cylindrical permanent magnet 16 magnetized along its axis to form north and south poles at opposite ends of the magnet. Bearing against the ends of the rotor magnet are circular end plates 17 and 18 formed of a suitable magnetic material such as silicon steel. The end plate 17 has formed around its periphery a set of equally spaced elongated teeth 19 having end portions 20 extending over but spaced from the sides of magnet 16 to form pole pieces. Similarly, the end plate 18 has formed around its periphery a set of equally spaced elongated teeth 21 having end portions 22 extending over but spaced from the sides of magnet 16 to form additional pole pieces. The end plates 17 and 18 have the same number of teeth and are arranged so that the pole pieces 20 and 22 are staggered and form air gaps 23 between the end portions thereof as best shown in FIG. 2. With the magnetic polarization of the rotor magnet 16 shown in FIG. 1, the pole pieces 20 form north poles and the pole pieces 22 south poles as designated by the letters N and S adjacent the opposing end portions thereof. It will be noted that the teeth 19 and 21 of end plates 17 and 18 curve inwardly so that the end portions 20 and 22 forming the pole pieces extend in a direction parallel to the rotor axis. Thus, the rotor magnet 16 is enclosed in a cage which protects it from the demagnetizing action of any stray magnetic fields. Also, the airgaps 23 provide a keepering action which prevents knockdown of the rotor magnet as will be further explained.

The rotor magnet 16 and the end plates 17 and 18 are secured in the assembled position by a nonmagnetic flanged sleeve 24. The sleeve is mounted on the end of shaft 13 with a press fit and secured thereto in a suitable manner as by a retaining shoulder 25 on shaft 13 and a threaded nut 26. It will be understood that this construction permits the rotor to be removed as a unit without disturbing the magnet protection provided by the end plates 17 and 18 as mentioned above.

Figure 3:
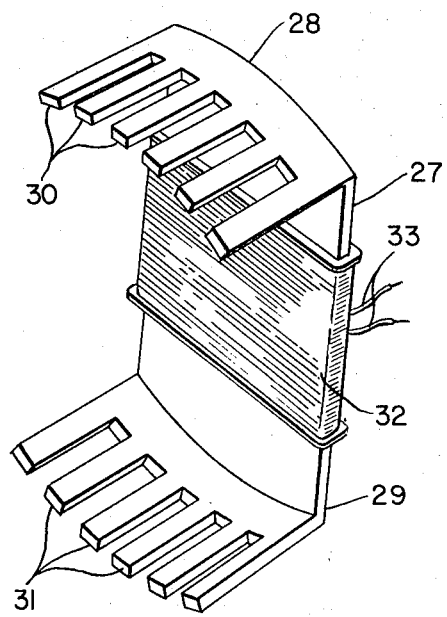
FIG. 3 is a side perspective view of the stator bridging member on which the voltage output coil is mounted.

The stator comprises a bridging member 27 which functions to conduct magnetic flux between pole pieces 20 and 22 located on opposite sides of rotor 10. It is preferably made of a low reluctance magnetic material such as Mumetal. As best shown in FIG. 3, the bridging member has arcuate end portions 28 and 29 from which extend laterally, in a direction parallel to the rotor axis, two groups of bridging fingers 30 and 31 so as to overlie the rotor pole pieces 20 and 22. The spacing between the axial center lines of the bridging fingers of each group is made equal to the pitch of the teeth on end plates 17 and 18. Also, as best shown in FIG. 5, the circumferential spacing between the two groups of fingers 30 and 31 is made such that when the fingers 30 are aligned with north pole pieces 20 on the top of the rotor the fingers 31 are aligned with south pole pieces 22 on the bottom of the rotor. After the rotor has rotated from the position shown, an amount equal to one-half the pitch of the rotor teeth, the fingers 30 become aligned with the south poles on the top of the rotor, and the fingers 31 become aligned with the north poles on bottom. By proper design of the magnetic flux conducting areas between fingers 30, 31 and pole pieces 20, 22 and the length of the airgaps therebetween, the reluctance of the working magnetic circuit through the bridging member is made as low as possible with respect to the reluctance of the magnetic circuit path directly between adjacent rotor pole pieces across airgaps 23 when the bridging fingers and pole pieces are aligned. Thus, rotation of the rotor causes a maximum reversing magnetic flux to flow through the bridging member which induces a voltage in an induction coil 32 mounted on the bridging member. Output voltage across leads 33 of the coil has a frequency determined by the rotor speed and the number of rotor teeth.

It is not necessary to have more than one bridging finger on each side of the rotor. However, the provision of a group of fingers on each side increases the amount of flux which can be collected from the rotor and hence, the output of coil 32. In the illustrated arrangement, six fingers are provided in each group.

Figure 4:
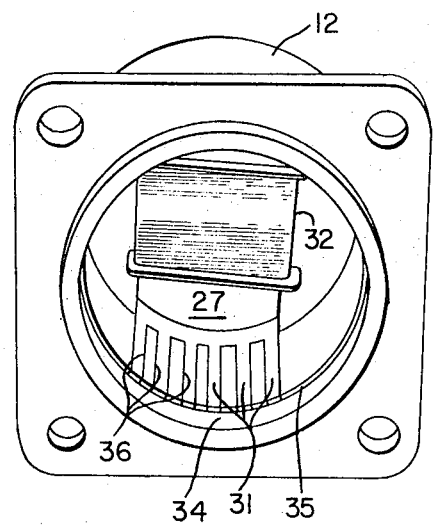
FIG. 4 is a front perspective view of the generator casing illustrating the manner in which the stator bridging member is mounted and supported in the casing.

The manner in which the bridging member 21 is supported in the generator casing 12 is best shown in FIG. 4. The casing, which is formed of a nonmagnetic material such as aluminum, has a central bore 34 with a raised portion 35 between the ends. The raised portion is provided with a series of axial slots 36 designed to receive and support the bridging fingers 30 and 31 and the integrally formed bridging member 27. With this arrangement, the bridging member and coil may be easily removed for inspection and repair by pulling out the assembly through the back side of the casing. Access to the inside of the casing is provided by a removable cover plate 37 which may carry a connector 38 to which the coil leads 33 are connected.

It will be understood that for a given speed of operation, the frequency output of the generator may be changed by varying the number of teeth on the end plates 17 and 18. Since the flux threading the output coil 32 makes a complete reversal during the time required for the rotor to rotate an amount equal to the pitch of the rotor teeth, it will be apparent that the frequency of the output voltage induced in the output coil 32 will be the number of rotor teeth on each end plate multiplied by the number of revolutions of the rotor per unit of time. Thus, for example, if the generator has 31 teeth on each end plate and has a normal operating speed of 4,200 revolutions per minute, the frequency output of the generator will be 2,170 cycles per second.

An important advantage of the generator construction described above is that flux reversal through the output coil 32, with resulting higher output voltage, is obtained utilizing only one rotor magnet. This permits the size and weight of the rotor to be reduced to a point where it becomes practical to mount the rotor directly on the output shaft without the need for separate generator bearings. By eliminating the bearings the problems encountered with high temperature operation of generator bearings are also eliminated. It will also be noted that the rotor parts are symmetrical thereby facilitating dynamic balance and assembly.

In addition to simplicity of design and light weight, the generator construction provides important features in magnet operation and protection against knockdown. Through proper design of the pole pieces 20 and 22 and the spacing of the airgaps 23 therebetween the rotor magnet 16 may be made to operate at a point on its demagnetization curve providing maximum flux for the amount of magnet material used. Also, the pole pieces 20 and 22 which surround the magnet provide a keepering action which gives protection against knockdown. Thus, the rotor may be removed from the generator as a unit without opening up airgaps in the flux path between the magnet poles that would result in knockdown and resulting loss of magnet power.

While there has been shown what is considered to be a preferred embodiment of the invention, it will be apparent to those skilled in the art that various changes and modifications may be made therein without departing from the spirit and scope of the invention.

What is claimed as new and desired to be secured by Letters Patent of the United States is:

1. An alternating current generator comprising:
   a. a rotor formed of a cylindrical permanent magnet magnetized along its axis and circular endplates of magnetic material adjacent opposite ends of the magnet, each endplate having formed around its periphery a set of equally spaced elongated teeth with end portions forming pole pieces extending around, over and spaced from the sides of the magnet, each set of pole pieces having opposite magnetic polarity and being staggered relative to the other set with air gaps therebetween,
   b. a stator comprising a bridging member formed of magnetic material and having two groups of fingers extending therefrom adjacent to the pole pieces of the rotor and groups of fingers being spaced so that all of the fingers of one group lie adjacent rotor pole pieces having the same polarity at the same time that all of the fingers of the other group lie adjacent to rotor pole pieces having the opposite polarity, the two groups of fingers being disposed on opposite sides of the rotor whereby upon rotation of the rotor each finger alternately lies adjacent to rotor poles of opposite polarity causing a reversing magnetic flux through the bridging member, and,
   c. an induction coil disposed in magnetic relation with the bridging member whereby the alternating magnetic flux therein causes an alternating voltage to be induced in said coil.

2. An alternating current generator as set forth in claim 1 wherein the rotor pole pieces have portions extending in a direction parallel to the axis of the rotor.

3. An alternating current generator as set forth in claim 2 wherein the rotor pole pieces and bridging member fingers are spaced and dimensioned so that the reluctance of the magnetic flux path from the rotor pole pieces through the bridging member fingers has a minimum value with respect to that of the flux path directly between the rotor pole pieces when the rotor occupies a position such that the fingers of the bridging member are aligned with the pole pieces of the rotor.

4. An alternating current generator as set forth in claim 1 including a casing of nonmagnetic material housing the rotor and stator, the stator being supported in the casing by fastening means comprising axial slots in the casing adapted to receive the fingers of the bridging member in sliding engagement when the stator is inserted into the casing.

5. An alternating current generator as set forth in claim 1 wherein the rotor is mounted on a shaft supported independently of the casing whereby the casing and stator may be disassembled without affecting the rotor.

* * * * *